No. 637,350. Patented Nov. 21, 1899.
J. R. ROWLANDS.
TRICYCLE.
(Application filed Feb. 4, 1897. Renewed Apr. 5, 1899.)
(No Model.) 3 Sheets—Sheet 1.
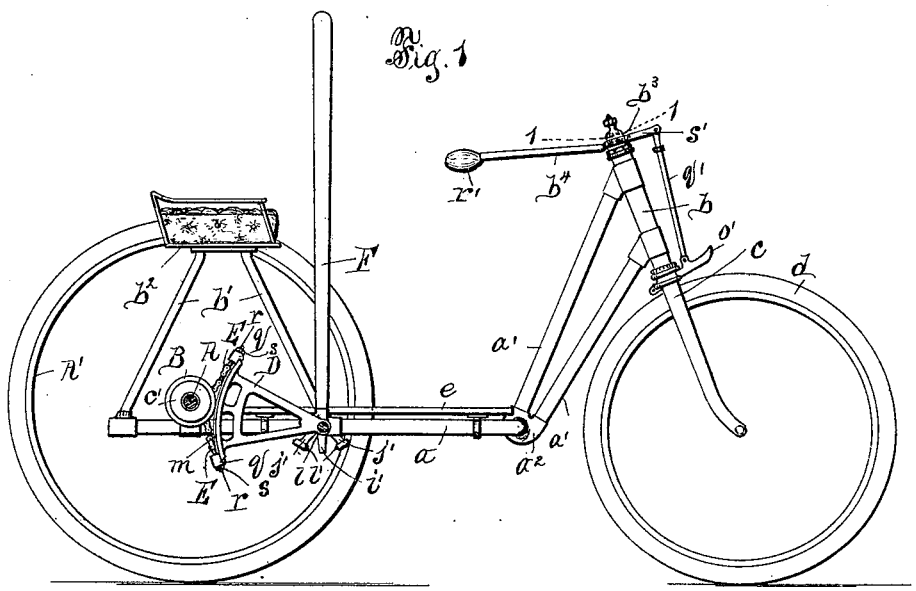
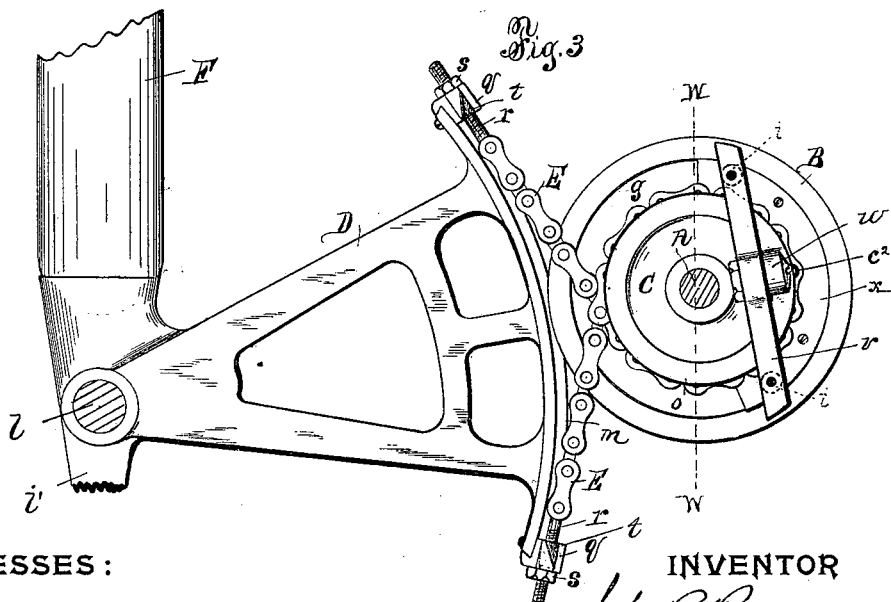
WITNESSES:
INVENTOR
John R Rowlands
By E. Laass
his ATTORNEY
THE NORRIS PETERS CO., PHOTO-LITHO., WASHINGTON, D. C.

No. 637,350. Patented Nov. 21, 1899.
J. R. ROWLANDS.
TRICYCLE.
(Application filed Feb. 4, 1897. Renewed Apr. 5, 1899.)
(No Model.) 3 Sheets—Sheet 2.
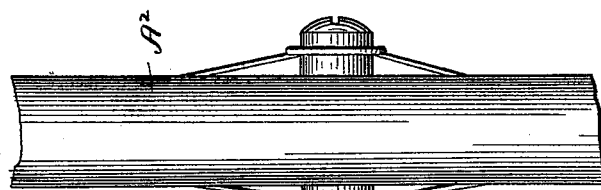
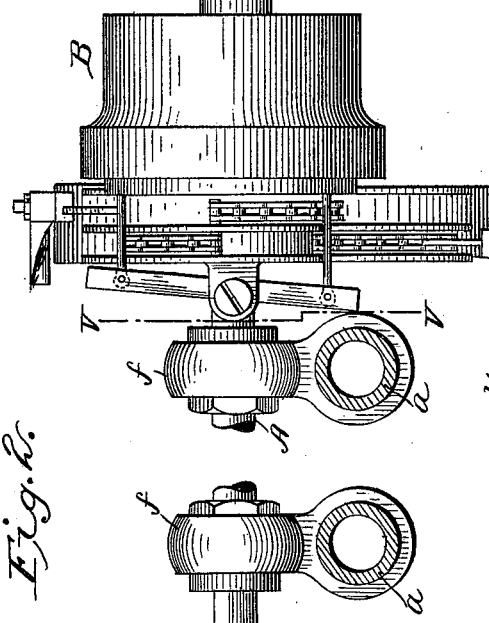
Fig. 2.
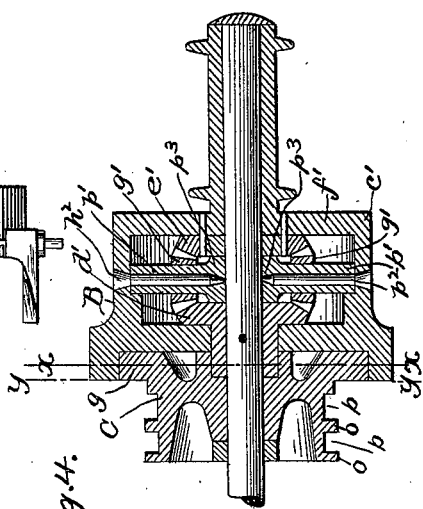
Fig. 4.
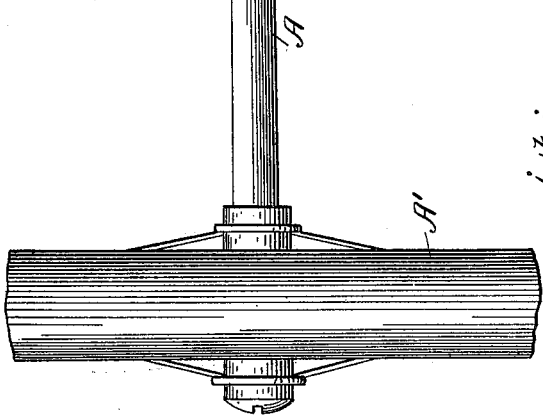
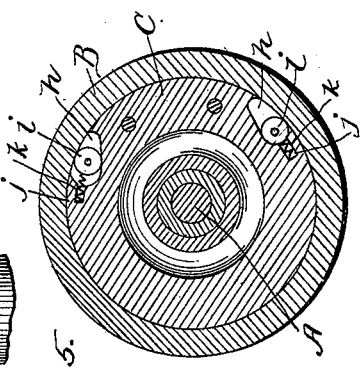
Fig. 5.
WITNESSES
INVENTOR
John R. Rowlands
By E. Lacey
his Attorney No. 637,350. Patented Nov. 21, 1899.
J. R. ROWLANDS.
TRICYCLE.
(Application filed Feb. 4, 1897. Renewed Apr. 5, 1899.)
(No Model.) 3 Sheets—Sheet 3.
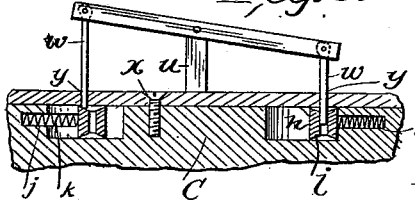
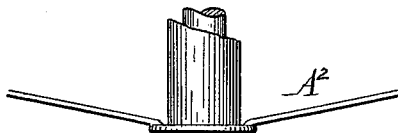
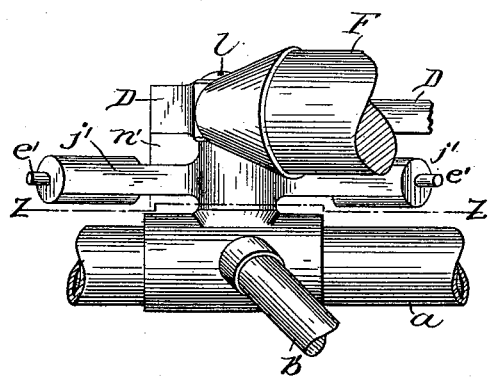
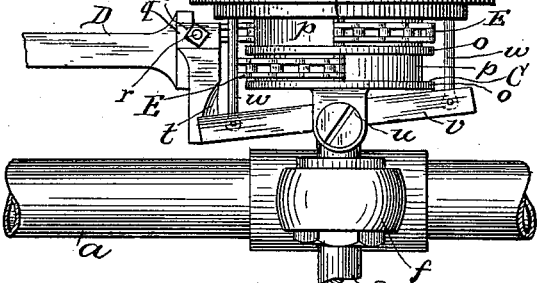
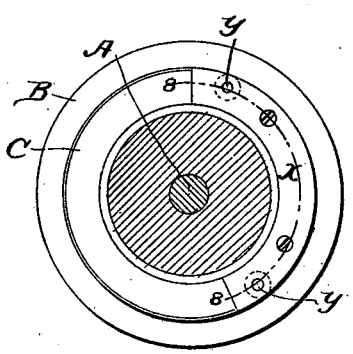
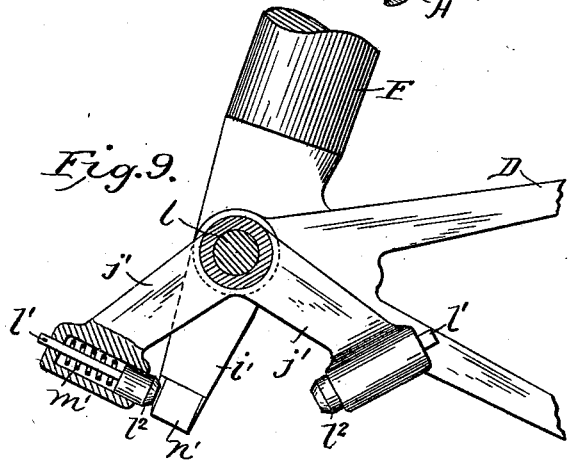
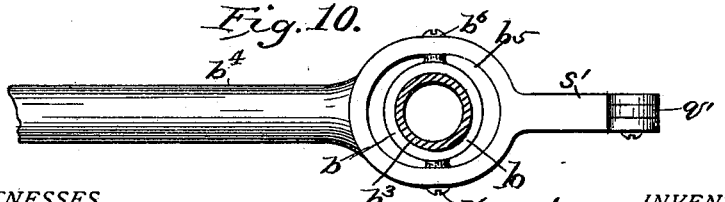
WITNESSES
INVENTOR: John R. Rowlands
By E. Lacey
his Attorney

UNITED STATES PATENT OFFICE.

JOHN R. ROWLANDS, OF SYRACUSE, NEW YORK, ASSIGNOR TO CHARLES H. SHATTUCK, OF SAME PLACE.

TRICYCLE.

SPECIFICATION forming part of Letters Patent No. 637,350, dated November 21, 1899.

Application filed February 4, 1897. Renewed April 5, 1899. Serial No. 711,820. (No model.)

*To all whom it may concern:*

Be it known that I, JOHN R. ROWLANDS, of Syracuse, in the county of Onondaga, in the State of New York, have invented new and useful Improvements in Tricycles, of which the following, taken in connection with the accompanying drawings, is a full, clear, and exact description.

This invention relates to mechanically-propelled vehicles, but more especially to manually-operated tricycles; and it consists in a novel construction of the mechanism which transmits motion to the traction-wheel and is equipped with simple and efficient means for quickly reversing the travel of the vehicle merely by a secondary or an additional stroke applied to the propelling-lever, substantially as hereinafter described, and particularly pointed out in the subjoined claims.

In the annexed drawings I have shown my invention applied to that class of manually-operated vehicles termed "tricycles."

In said drawings, Figure 1 is a side elevation of a tricycle equipped with my improved operating means, the nearer rear wheel of the tricycle being removed to show the mechanism more clearly. Fig. 2 is an enlarged rear end elevation. Fig. 3 is a transverse vertical section on the line V V in Fig. 2. Fig. 4 is a vertical transverse section on line W W in Fig. 3. Fig. 5 is a vertical transverse section in line X X in Fig. 4. Fig. 6 is a vertical transverse section in line Y Y in Fig. 4. Fig. 7 is an enlarged plan view of part of the device, showing the hand-lever thrown back to the position in which it operates the reversing-lever. Fig. 8 is a sectional view, on the line 8 8 of Fig. 6, through the gripping-rollers and adjacent parts of the device and shows also the means for holding one of said rollers in operative position and the other in inoperative position. Fig. 9 is a horizontal section on the line Z Z in Fig. 7, showing the means for cushioning the hand-lever at the extremities of its strokes; and Fig. 10 is an enlarged detailed sectional view on line 1 1 in Fig. 1, showing the connection of the combined steering and braking lever to the steering-post of the vehicle.

The same letters of reference designate the same parts in the several views.

The frame of the vehicle to which my invention is applied may be of any suitable construction. The tricycle-frame shown in the accompanying drawings comprises the two horizontal members $a\,a$, converging toward the front and having their front ends inserted in a suitable coupling $a^2$, and the two members $a'\,a'$, extending divergently upward and forward from said coupling $a^2$ to the head $b$, to which they are firmly secured in any suitable manner. Rods $b'$ are fastened to and rise from the members $a\,a$ and support the seat $b^2$, and a platform $e$ is secured to said members $a\,a$.

A designates the axle of the traction and carrying wheels, which axle is journaled in brackets $f\,f$, equipped with antifriction-bearings for said axle. These brackets have firmly secured to them and support the rear end portions of the frame members $a\,a$. On one end of this axle is rigidly secured the carrying-wheel $A'$, and on the other end of said axle is journaled the traction-wheel $A^2$.

B designates the clutch-collar, and C the coöperating clutch member, which form part of the driving mechanism for the driving-wheel $A^2$. Said clutch-collar is formed with an outwardly-extending casing $c'$, in which are located the equalizing-gears by which motion is transmitted from said clutch-collar to the traction-wheel and its axle, which gears consist of two main gears $d'$ and $e'$, secured, respectively, to the axle A and to the plate $f'$, which plate is formed integral with or attached to the hub of said traction-wheel and closes the end of said casing, and the intermediate gears $g'\,g'$, journaled on two radial shafts $p'\,p'$, which shafts are secured at their outer ends to the casing $c'$ by means of the screws $p^2$ and are joined together at their inner ends by the hub $p^3$, journaled on said axle A. The clutch member C is rotated by an improved mechanism which constitutes one of the important features of my invention and which will now be described.

D designates an oscillatory segment pivoted on a horizontal trunnion $l$, projecting from one of the frame members $a$. The peripheral face of said segment is provided with longitudinal ribs $m\,m$, forming intermediate grooves $n$. The clutch member C is provided with annular flanges $o\ o$, similar to the ribs $m\ m$ on the segment, which flanges form grooves $p\ p$, extending around the periphery of said clutch member. To the upper end of said segment is secured an end of a cable, chain, or analogous flexible device E, which extends thence to said clutch member, around the under side of the same within one of the aforesaid grooves, and is secured to said member by the pin $c^2$, while to the lower end of said segment is secured an end of a similar chain or cable, which extends thence to said clutch member, around the upper side of the same within the other groove thereof, and is secured at its end to said member by the aforesaid pin $c^2$. Thus it will be seen that oscillatory motion given to said segments imparts a corresponding oscillatory motion to said clutch member, and it will be understood that, as usual, suitable gripping devices are located within the clutch for transmitting motion from said member D to said collar B and that the motion of the latter is communicated to the traction-wheel $A^2$ by means of the equalizing-gears above described. The employment of the two chains or cables for transmitting motion from the segment to the clutch member effectually relieves the vehicle from the rattling and jarring incident to the toothed gearing heretofore used for the same purpose. In order that the tension of the chains or cables E E may be adjusted, I prefer to provide the ends of said segment with blocks $q\ q$, through which blocks pass screw-threaded rods $r\ r$, that are fastened to the ends of said chains or cables, and said screws are provided with adjusting-nuts $s\ s$, which bear upon said blocks. Said segment is oscillated by means of a hand-lever F, secured to the pivoted end thereof.

As indicated above, it is common to operate the two parts B and C of the clutch by proper intermediately-arranged gripping devices, preferably embodying spring-pressed rollers traveling in tapered recesses formed in one member of the clutch and gripping the other member of the clutch when in the narrower part of their respective recesses; but one of the essentially new and important features of this invention resides in the construction now to be described, whereby the direction of travel of the vehicle may be quickly and easily reversed and the user is enabled to run the vehicle in a rearward direction as well as forward with great facility. To this end said part of my invention consists, essentially, in the combination, with the traction-wheel, of a propelling device having a main and a secondary movement, means connecting said propelling device with the traction-wheel and operated by the main movement of said propelling device to transmit motion to said wheel, and a reversing mechanism actuated by the secondary movement of the propelling device to reverse the travel of said traction-wheel. Said part of my invention is preferably embodied in the following construction and combination of parts, to wit: The spring-pressed rollers $i\ i$ are located within reversely-tapered recesses $h\ h$, preferably formed in the periphery of a ring $g$, that is located within the clutch-collar B and forms part of the clutch member C, and extending from the wider ends of said recesses are sockets $j\ j$, in which are located the spiral springs $k\ k$, which bear against the rollers and force the same in one direction—as, for example, into the narrower end of said recesses, as shown in the drawings. These gripping devices are forced and held one at a time against the action of the respective springs by a shifting device (see Fig. 8) comprising a lever $v$, pivoted on a bracket or support $u$, projecting from said clutch member C, to the ends of which lever are connected the outer ends of two horizontal rods $w\ w$, the inner ends of which are located within or adjacent to channels $j\ j$, formed in the ends of said gripping-rollers. To the ring $g$ of said clutch member C is secured a segmental plate $x$, which covers the recesses $h\ h$ and confines the rollers therein. Said plate is provided with two holes $y\ y$, through which the rods $w\ w$ pass and are thereby guided.

In propelling the vehicle only one of the gripping-rollers $l\ l$ at a time is allowed to assume operative position, the other roller being held out of operative position by one of the rods $w$, forced into said roller by the tilting of the lever $v$, and when it is desired to reverse the motion of the vehicle the lever $v$ is tilted in the opposite direction to withdraw the inwardly-forced rod $w$ from engagement with the adjacent roller, which roller is then forced by the spring $k$ into its operative position in the narrower part of the recess $h$. Simultaneously with the withdrawal of the aforesaid inwardly-forced rod the lever $v$ forces the other rod $w$ into the adjacent roller $i$ and crowds the same back into the larger part of its recess $h$ and confines it therein to retain it in inoperative position. It will be seen that when a roller is in operative position the channel $j$ therein is out of axial line with the rod $w$, and in order to insure that the rod will, when desired, enter said channel and force said roller into inoperative position I make said channels $j\ j$ flaring at their outer ends and taper the adjacent ends of the rods $w\ w$, as shown in Fig. 8 of the drawings.

In order that the shifting-lever $v$ may be operated by the secondary movement of the hand-lever F, as hereinbefore mentioned, the blocks $q\ q$ on the ends of the segment D are formed with cams $t\ t$, one of which at a time is by an excessive, or that is to say the secondary, stroke of the hand-lever F, brought into engagement with one end of said shifting-lever to turn it upon its pivot in one direction, while a reverse excessive stroke of the hand-lever F brings the other cam $t$ into engagement with the end of said shifting-lever to turn it in the other direction.

From the above description the operation of propelling the vehicle will be readily understood to be as follows: In the forward stroke of the lever F when the vehicle is being propelled forward the clutch member C is caused to turn backward, and the unlocked roller $i$ in the recess $h$, which is tapered in the latter direction, is unable to grip the clutch-collar B, and when said lever is given a rearward stroke the clutch member is given a forward turn, which causes said operative roller to become pinched between the clutch-collar B and clutch member C, whereby said clutch-collar is caused to turn forward with said clutch member, and its motion is transmitted, through the medium of the equalizing-gears hereinbefore described, to the traction-wheel $A^2$. When the vehicle is moving in the aforesaid direction, the lever F is given a short forward stroke in order that the cam $t$ on the upper end of the segment D will not strike the lever $v$; but when it is desired to reverse the direction of travel of the vehicle the lever F is given a further forward stroke, thereby bringing said cam into engagement with the lever $v$, causing it to unlock the previously-inoperative roller and allowing said roller to become operative and simultaneously to lock the previously-operative roller into inoperative position, whereby the now operative roller in pinched between the collar B and clutch member C in the forward stroke of the hand-lever F and is released in the rearward stroke thereof in the manner aforesaid, and thus the vehicle is moved backward, and when it is desired again to travel forward the lever F is given a full rearward stroke, and thus the other cam is caused to shift the lever $v$. Thus it will be observed that reversing the direction of travel of the vehicle is effected simply by increasing the last stroke of the same hand-lever that is used to impart motion to the gearing for transmitting motion to the traction-wheel $A^2$, the advantage of which is obvious, and that in the event the rider releases the lever F while the vehicle is in motion the construction of the gripping mechanism is such that the lever will cease to operate; but the vehicle will continue to move until it has lost its momentum.

Cushioned stops are provided to limit the strokes of the lever F and to obviate jarring. These stops preferably comprise an arm $i'$, extending downward from the pivoted end of said lever F, and two diverging arms $j'\,j'$, secured rigidly at their junction to the trunnion $l$ and having their free ends arranged to allow the arm $i'$ to play between them. The arms $j'\,j'$ are provided with transverse sockets or recesses which receive springs $m'\,m'$, that are coiled around the stems $l'\,l'$ of the stops proper, $l^2\,l^2$, and press said stops yieldingly outward to cause them normally to protrude from said arms $j'\,j'$, as clearly shown in Fig. 9.

Referring now to Figs. 1 and 10, I will proceed to describe the combined steering and braking mechanism which I prefer to use.

The steering-fork $c$ has a fork-stem $b^3$ extending upward through the head $b$, and to said fork is pivoted the rear end of a brake-shoe $o'$, to which is pivoted the lower end of the upwardly-extending brake-rod $q'$, all of which parts are or may be similar to the corresponding parts of the bicycles now used. $b^4$ designates a lever which extends rearward from the upper end of said fork-stem and is provided at its rear end with a handle $r'$. This lever has a forwardly-projecting part $s'$, to which is pivoted the upper end of said brake-rod $q'$. It is formed with an opening $b^5$, through which the fork-stem extends loosely, and it is pivoted at diametrically opposite sides of said opening $b^5$ upon horizontal pins $b^6$, secured to said fork-stem. Hence the lever $b^4$ is free to move in a vertical plane upon the pivot-pins $b^6$, and thereby brings the brake-shoe into frictional engagement with the tire of the front wheel of the vehicle when the handle $r'$ is raised, and its aforesaid connection with the fork-stem affords sufficient hold thereon to allow the latter to be turned, and thus the vehicle is steered by swinging the lever $b^4$ in a horizontal plane. It will be noted that the vehicle is propelled with one hand of the rider and steered and the brake controlled with the other hand of the rider.

Having thus described my invention, what I claim is—

1. The combination with the two members of a clutch, one of said members having reversely-tapered recesses adjacent to the other member, and spring-pressed gripping-rollers in said recesses, having channels, of a pivoted shifting-lever having rods to engage said channels and thereby force and lock said rollers one at a time, against the action of their respective springs, substantially as described and for the purposes set forth.

2. In a vehicle, the combination with the traction-wheel and axle, of a clutch-collar connected with the traction-wheel and a cooperating clutch member, one of said parts of the clutch having reversely-tapered recesses adjacent to the other part, spring-pressed gripping-rollers in said recesses, means for locking said gripping-rollers one at a time against the action of the respective springs, and mechanism for actuating said locking means to reverse the direction of travel of the vehicle.

3. In a vehicle, the combination with the traction-wheel and axle, of a clutch, one member of which is connected with said traction-wheel and the other provided with means for operating it, one of said clutch members being formed with reversely-tapered recesses adjacent to the other member, spring-pressed gripping-rollers in said recesses, said rollers having channels, a shifting-lever having rods to engage said channels and lock the rollers one at a time against the action of their respective springs, and means for operating said shifting-lever to reverse the motion of the vehicle, substantially as described.

4. In a vehicle, the combination with the axle, and traction-wheel, of a clutch comprising two members, one of which is connected with said traction-wheel and the other provided with driving mechanism, one of said clutch members being formed with reversely-tapered recesses adjacent to the other member, a lever pivoted to the clutch, horizontal rods each connected at one end to one end of said lever and having its other end tapered, and spring-pressed rollers seated in said recesses and having horizontal channels flared at their ends to receive the tapered ends of said rods, said channels being out of line with said rods when the rollers are in operative position, and means for operating said lever to cause the rod on one end thereof to enter the channel of the adjacent roller and throw and lock said roller against the action of the spring, and simultaneously to release the other rod from the adjacent roller, thereby reversing the motion of the vehicle, as specified.

5. The combination with the traction-wheel, of a propelling device having a main and a secondary movement, means connecting said propelling device with the traction-wheel and operated by the main movement of said propelling device to transmit motion to said traction-wheel, and a reversing mechanism actuated by the secondary movement of said propelling device to reverse the travel of said traction-wheel, substantially as described.

6. The combination with the traction-wheel, of a propelling device having a main and a secondary movement, a clutch having one of its members connected with said traction-wheel and its other member actuated by the main movement of said propelling device, and a reversing mechanism operating upon said clutch for reversing the travel of said traction-wheel, said reversing mechanism being actuated by the secondary movement of said propelling device, substantially as described.

7. The combination with the traction-wheel, of a propelling device having a main and a secondary movement, a clutch having one of its members connected with said traction-wheel and its other member actuated by the main movement of said propelling device, gripping devices within said clutch for causing said members to rotate in unison, one of said gripping devices being operative when the wheel is rotating forward and the other when the wheel is rotating rearward, and means actuated by the secondary movement of said propelling device for releasing one of said gripping devices and simultaneously locking the other in inoperative position, thereby reversing the travel of the wheel, substantially as described.

8. The combination with the traction-wheel, of a propelling device having a main and a secondary movement, a clutch having one of its members connected with said traction-wheel and its other member actuated by the main movement of said propelling device, said clutch being formed with reversely-tapered recesses, and having spring-pressed rollers within said recesses, and a reversing device actuated by the secondary movement of said propelling device to lock one of said rollers against the action of its spring and simultaneously to release the other roller, substantially as described and for the purposes specified.

9. The combination with the traction-wheel, of a propelling device having a main and a secondary movement, a clutch having one of its members connected with said traction-wheel and its other member actuated by the main movement of said propelling device, gripping devices within said clutch for causing said members to rotate in unison, one of said gripping devices being operative when the wheel is rotating forward and the other when the wheel is rotating rearward, and a pivoted lever having rods at its ends to engage said gripping devices and lock the same one at a time, in inoperative position, said lever being actuated by the secondary movement of said propelling device to release one of said gripping devices and simultaneously lock the other, substantially as described and for the purposes specified.

10. The combination with the traction-wheel, of a propelling-lever, a clutch having one of its members connected with said traction-wheel and its other member connected with said lever and actuated thereby, gripping devices for locking said clutch members together, one of said gripping devices being operative when the wheel is rotating forward and the other when the wheel is rotating rearward, and means actuated by an excessive stroke of said lever for locking one of said gripping devices and releasing the other simultaneously, substantially as described and for the purposes specified.

11. The combination with the traction-wheel, of a propelling-lever, a clutch having one of its members connected to said wheel and its other member connected with said lever, one of said clutch members having reversely-tapered recesses, gripping-rollers in said recesses, and a device actuated by an excessive stroke of said lever to lock one of said gripping-rollers and unlock the other simultaneously, substantially as described.

12. The combination with the traction-wheel, of a propelling-lever, a clutch having one of its members connected with said wheel and its other member connected with said lever, one of said clutch members having reversely-tapered recesses, spring-pressed rollers in said recesses, a shifting-lever having rods to engage said rollers and lock the same against the action of their respective springs, said shifting-lever being actuated by an excessive stroke of said propelling-lever to lock one of said rollers and release the other simultaneously, substantially as described.

13. The combination with the traction-wheel, of a pivoted segment, a clutch, one of the members of which is connected with said wheel and the other with said segment, gripping devices in said clutch, one of said gripping devices being operative when the wheel is rotating forward and the other of said gripping devices being operative when the wheel is rotating rearward, a shifting-lever having means for locking said gripping devices one at a time, in inoperative position, engaging means carried by said segment, to engage said shifting-lever, and a propelling-lever connected to said segment and actuating the same to rotate the wheel either forward or rearward, and to impart an excessive stroke to the segment to cause said engaging means to operate said shifting-lever and thereby reverse the travel of said wheel, as specified.

14. The combination with the traction-wheel, of a pivoted segment having cams on the ends of its peripheral face, a clutch having one of its members connected with said wheel and its other member connected with said segment, one of said members being formed with reversely-tapered recesses adjacent to the other member, spring-pressed gripping-rollers in said recesses, a pivoted shifting-lever having rods arranged to engage said rollers and to lock the same one at a time in inoperative position, the ends of said shifting-lever being arranged to be engaged by the cams on the ends of said segment when an excessively long stroke is imparted to the latter, and means for transmitting motion to said segment.

15. In a vehicle, the combination with the traction-wheel and axle, of a clutch-collar and coöperating clutch member, two reversely-tapered recesses in said clutch member, a pair of spring-pressed gripping-rollers in said recesses, a shifting-lever pivoted to the clutch member and provided with two horizontal rods adapted to engage the rollers and throw the same one at a time out of operation, an oscillatory segment connected with said clutch-collar and also provided with means for actuating said shifting-lever, and means for operating said segment.

In testimony whereof I have hereunto signed my name this 8th day of January, 1897.

JOHN R. ROWLANDS. [L. S.]

Witnesses:
JOHN J. LAASS,
H. B. SMITH.